3,342,829
BIS-QUATERNARY SALTS OF TRIAMINES AND PROCESS FOR PREPARING THEM

Manfred Schorr and Rudolf Fussgänger, Frankfurt am Main, Germany, assignors to Farbwerke Hoechst Aktiengesellschaft vormals Meister Lucius & Brüning, Frankfurt am Main, Germany, a corporation of Germany
No Drawing. Filed June 9, 1964, Ser. No. 373,851
Claims priority, application Germany, June 15, 1963, F 40,000
5 Claims. (Cl. 260—296)

The present invention relates to bis-quaternary salts of triamines and to a process for preparing them by reacting reactive esters of bis-(hydroxyethyl)-amines with tertiary amines.

It has been found that bis-quaternary salts of triamines of the Formula I

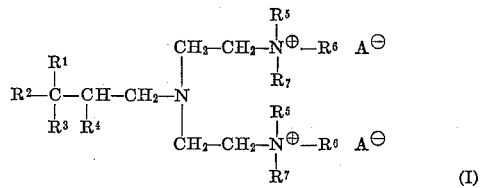

which compounds possess excellent antibacterial properties, can be prepared by reacting reactive esters of bis-(hydroxyethyl)-amines of the Formula II

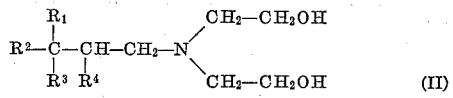

with tertiary amines of the Formula III

In the formulae indicated above $R^1$ represents a halosubstituted phenyl radical,
$R^2$ and $R^3$ each are hydrogen or a phenyl radical which may be substituted by a halogen atom,
$R^4$ represents hydrogen, a halosubstituted phenyl or halosubstituted benzyl radical,
$R^5$ is an amino group or an alkyl group of up to 6 carbon atoms,
$R^6$ and $R^7$ each represent a low molecular alkyl group,
$R^6$ and $R^7$ together with the nitrogen atom form a saturated heterocyclic ring,
$R^5$, $R^6$ and $R^7$ together with the nitrogen atom form an unsaturated heterocyclic ring, and
$A^\ominus$ is the anion of a non-toxic acid which may also be a component of the radical $R^5$.

Alkyl groups in $R^5$-position may also be substituted, advantageously by a carboxy, carbonamide, acetyl, lower acyloxy or sulfo group and particularly by a hydroxyl, cyano, lower carbalkoxy, lower acylamino, lower alkoxy and lower alkylmercapto group. The substituents $R^6$ and $R^7$ may also be substituted if they represent low molecular alkyl groups, advantageously by hydroxyl groups. The saturated and unsaturated heterocyclic rings mentioned above possess preferably 5 to 7 ring members, one of which may also be an oxygen, sulfur or nitrogen atom. Especially piperidine and pyridine enter into consideration, furthermore, morpholine, quinoline, thiazole, benzthiazole or hexamethylene-imine. These heterocyclic rings may also be substituted, advantageously by a lower alkyl, lower alkoxy, lower carbalkoxy, carbonamide or cyano group. As halogen substituents of the radicals $R^1$, $R^2$, $R^3$ and $R^4$, fluorine, bromine and particularly chlorine enter into consideration. As starting materials for the reaction according to the present invention, the reactive esters of the following bis-(hydroxyethyl)-amines are mentioned as examples:

N-[γ,γ,γ-tri-(4-chlorophenyl)-propyl]-N,N-bis-(β-hydroxyethyl)-amine
N-[γ-phenyl-γ,γ-bis-(4-chlorophenyl)-propyl]-N,N-bis-(β-hydroxyethyl)-amine
N-[γ-(3-chlorophenyl)-γ,γ-bis-(4-chlorophenyl)-propyl]-N,N-bis-(β-hydroxyethyl)-amine
N-[γ-(3-fluorophenyl)-γ,γ-bis-(4-chlorophenyl)-propyl]-N,N-bis-(β-hydroxyethyl)-amine
N-[γ,γ-bis-(4-fluorophenyl)-γ-(4-chlorophenyl)-propyl]-N,N-bis-(β-hydroxyethyl)-amine
N-[γ,γ-bis-(4-chlorophenyl)-propyl]-N,N-bis-(β-hydroxyethyl)-amine
N-[γ-(3,4-dichlorophenyl)-γ-(4-chlorophenyl)-propyl]-N,N-bis-(β-hydroxyethyl)-amine
N-[γ-(2,4,5-trichlorophenyl)-γ-(4-chlorophenyl)-propyl]-N,N-bis-(β-hydroxyethyl)-amine
N-[β-(2,4,5-trichlorophenyl)-γ-(4-chlorophenyl)-propyl]-N,N-bis-(β-hydroxyethyl)-amine
N-[γ-(4-fluorophenyl)-γ-(4-chlorophenyl)-propyl]-N,N-bis-(β-hydroxyethyl)-amine
N-[β,γ-bis-(4-chlorophenyl)-propyl]-N,N-bis-(β-hydroxyethyl)-amine
N-[β,γ-bis-(3,4-dichlorophenyl)-propyl]-N,N-bis-(β-hydroxyethyl)-amine
N-[β-(4-chlorophenyl)-γ-(2,4-dichlorophenyl)-propyl]-N,N-bis-(β-hydroxyethyl)-amine
N-[β,β-bis-(4-chlorobenzyl)-ethyl]-N,N-bis-(β-hydroxyethyl)-amine
N-[β,β-bis-(3,4-dichlorobenzyl)-ethyl]-N,N-bis-(β-hydroxyethyl)-amine
N-[β,β-bis-(2,4-dichlorobenzyl)-ethyl]-N,N-bis-(β-hydroxyethyl)-amine
N-[β-(4-chlorophenyl)-γ-(4-fluorophenyl)-propyl]-N,N-bis-(β-hydroxyethyl)-amine
N-[β-(4-chlorophenyl)-γ-(4-bromophenyl)-propyl]-N,N-bis-(β-hydroxyethyl)-amine
N-[β-(4-chlorophenyl)-γ,γ-bis-(4-chlorophenyl)-propyl]-N,N-bis-(β-hydroxyethyl)-amine.

Tertiary amines which are suitable according to the present invention for the reaction with reactive esters are for example: lower trialkylamines such as trimethylamine, triethylamine, tributylamine, triamylamine or dimethylbutylamine; tertiary alkanol amines such as β-diethylaminoethanol, γ-dimethylaminopropanol or triethanolamine; N,N-disubstituted aminocarboxylic acids and their functional derivatives, such as dimethylamino-acetic acid, γ-piperidino-butyric acid; dimethylamino-acetic acid methyl ester, α-diethylaminopropionitrile, γ-dimethylamino-butyronitrile and dipropylamino-acetic acid amide; asymmetrically disubstituted hydrazines such as N,N-dimethylhydrazine, N,N-bis-(β-hydroxyethyl)-hydrazine, N-amino-piperidine or N-amino-morpholine; saturated nitrogen containing heterocycles such as N-methylhexamethylene-imine, N-ethylpyrrolidine or N-methylpiperidine-carboxylic acid ethyl ether; unsaturated nitrogen containing heterocycles such as pyridine, picoline, lutidine, 3-methoxy-pyridine, 3-cyano-pyridine, nicotinic acid, isonicotinic acid ethyl ester, nicotinic acid amide, quinoline, thiazole, benzthiazole or 1-alkylbenzimidazole; tertiary amines substituted by alkoxy and alkyl mercapto groups, such as methoxy-ethyl-diethylamine and ethylmercaptoethyl-diethyl amine; N,N-disubstituted aminosulfonic acids such as diethyl amino-ethane sulfonic acid and tertiary amines substituted by acyl, acyloxy and acylamino groups such as diethyl-amino-acetone, propionic acid-piperidino ethyl ester and diethylamino-ethyl acetamide.

The acid radical A⊖ is derived in particular from the acids on which the reactive ester group of the bis-(hydroxyethyl)-amine is based. Hydrohalic acids, for example hydrochloric acid or hydrobromic acid, or sulfonic acids are preferably used. It is furthermore possible to replace the acid radical A⊖ formed after the reaction, in usual manner by the radical of another non-toxic acid, such as for example sulfuric acid, phosphoric acid, acetic acid, propionic acid, butyric acid, aceturic acid, stearic acid, tartaric acid, maleic acid, citric acid, aspartic acid and the like. The acid radical A⊖ may also be a component of the substituent $R^5$ so that quaternary ammonium salts of zwitter-ionic structure are formed.

As reactive esters of bis-(hydroxyethyl)-amines in particular the esters with hydrohalic acids, such for example as hydrochloric or hydrobromic acid, and with sulfonic acids, such for example as methane sulfonic acid or toluene sulfonic acid enter into consideration. The bis-(chloroethyl)-amines are of particular importance, because they can be prepared from easily accessible starting substances. They can be obtained, for example, in the form of their hydrochlorides from the corresponding bis-(hydroxyethyl)-amines by interaction of phosphorus halides or thionyl chloride (cf. German Patent 1,126,880).

The bis-(chlorethyl)-amines are sensitive to hydrolysis. In order to obtain the free bases from the hydrochlorides it is therefore advantageous to treat the latter in a benzene suspension with sodium bicarbonate and to isolate the free amines subsequently from the benzene solution by evaporation. The bis-(hydroxyethyl)-amines can be easily obtained from the corresponding primary amines by reaction with ethylene halogen hydrines or ethylene oxide (cf. German Patent No. 1,126,880).

The reaction of the reactive esters with the tertiary amines proceeds at room temperature very slowly only. It is therefore advantageous to operate at elevated temperatures, for example at 50 to 200° C. The preferred range of temperature is between 100 and 150° C. It is advantageous to operate in the presence of a solvent or a diluent.

Suitable are alkyl halides such as chloroform; ethers, such as diisopropyl ether; esters, such as ethyl acetate; ketones, such as acetone; or advantageously alcohols such, for example, as methanol, ethanol, isopropanol, butanol or ethylene glycol monomethyl ether. If the boiling point of the solvent used is below the chosen reaction temperature, the reaction is carried out in a closed vessel. The reactants are caused to act on each other in a stoichiometric proportion, i.e. in a proportion of 2 mols of amine to 1 mol of diethanol amine ester. In some cases, it can, however, be advantageous to use the amine in an excess in order to attain a quantitative reaction. If the tertiary amine used is an amino acid, the latter is advantageously converted into an alkali metal salt or an alkaline earth metal salt before the reaction takes place. In the course of the reaction there is formed from the metal cation, the salt with the anion of the acid on which the reactive ester is based, whereas the product of the invention can be isolated as bis-betaine.

The bis-(chlorethyl)-amines are advantageously used as free bases, since the reactivity of the halogen atoms is considerably reduced by the formation of salts at the amino group. In order to avoid the isolation of the amines it is advantageous to liberate them from the salts in the reaction medium only, by adding a further mol of the tertiary amine used for the reaction, which amine is then converted into a corresponding salt and must be separated after the completion of the reaction in suitable manner, for example by filtering with suction, after the addition of a suitable solvent. The bis-quaternary salts can be isolated in usual manner, for example by evaporating the solvent and, if desired, by a subsequent recrystallization.

The products of the present invention form colorless to light yellow solid substances or light to dark yellow, very viscous oils. They dissolve very readily in alcohol and water and do not precipitate from these solutions not even by the addition of alkali metal hydroxide solutions.

The salts obtained according to the process of the present invention possess valuable therapeutic properties. In particular, they are excellent bacteriostatics distinguished by a broad range of activity and being able to affect also gram-negative germs on which in general an influence can be exercised with difficulties only. In view of these properties the products of the present invention are particularly suitable as disinfectants in the most varied fields of application.

In the following table there are given the test results of two products of the invention from which the excellent activity against various microorganisms can be seen:

|  | Lowest effective concentration causing bacteriostatic activity in γ/ml. | |
| --- | --- | --- |
|  | a [1] | b [2] |
| Staphylococcus aureus | 0.8 | 0.8 |
| Streptococcus haemolyticus | 2 | 1.6 |
| Corynebacterium diphtheriae | 4 | 1.6 |
| E. coli | 2 | 4 |
| Pseudomonas aeruginosa | 8 | 8 |

|  | Lowest effective concentration causing bactericidal activity in γ/ml.—after 15 minutes | |
| --- | --- | --- |
|  | a [1] | b [2] |
| Staphylococcus aureus | 31.5 | 8 |
| E. coli | 125 | 31.5 |
| Pseudomonas aeruginosa | 31.5 | 31.5 |

[1] Substance a: N-[γ,γ,γ-tri-(4-chlorophenyl)-propyl]-N,N-bis-(β-pyridiniumethyl)-amine-dichloride.
[2] Substance b: N-[γ,γ,γ-tri-(4-chlorophenyl)-propyl]-N,N-bis-(β-N'-aminopiperidiniumethyl)-amine-dichloride.

The bactericidal activity of the new compounds was detected according to the so-called "Rideal-Walker-test."

The bacteriostatic activity was determined according to the known method by Wright in a series dilution test, according to the type of the germs used in a broth or in a serum broth as nutrient medium with a small inoculation. It was measured after an incubation period of 18–20 hours at 37° C. when the test solution was in a state of being between clear and turbid.

For the use of disinfectants it is in many cases of utmost importance that the substances are readily water-soluble in various pH-ranges. Contrary to other compounds of comparable structure exhibiting bacteriostatic activity, the products of the present invention meet the aforementioned requirement to a large extent. N-[γ,γ,γ-tri-(4-chlorophenyl)-propyl] - N,N - bis-(β - pyridiniumethyl)-amine-dichloride, for example, when being used with water in a proportion of 1:1 still forms a clear solution, whereas 100 cc. of water are required in order that 1 gram of N-[γ,γ,γ-tri-(4-chlorophenyl)-propyl]-N,N-bis-(β-hydroxyethyl)-N-methyl-ammoniummethyl sulfate, described in German Patent No. 1,124,048 dissolves while giving a clear solution, and 50 cc. of water are required in order that 1 gram of 1,1-diethyl-4-[β,β-bis-(3,4-dichlorobenzyl)-ethyl]-piperazinium chloride, described in German Patent No. 1,126,880, dissolves while giving a clear solution. Hence, it follows that the bis-quaternary salts, obtained according to the process of the present invention, are superior to the known compounds for the use as disinfectants.

When being used as disinfectants, the compounds of the present invention are suitable for technical disinfection, for example for the disinfection of milk-cans, floorings, sanitary fixtures etc. and particularly for medicinal disinfection, for example for the disinfection of the skin and of wounds. The compounds may be used in the form of gelees powders, ointments, pastes, mixtures which require shaking, tinctures or suspensions, in particular solutions.

For preparing the afore-mentioned preparations compounds enter into consideration which do not react with the new compounds, for example, water, gelatine, starch, talc, vegetable oils, petroleum jelly, zinc oxide and other suitable non-toxic inorganic or organic carriers. They may also contain further adjuvants, for example stabilizers, wetting agents or emulsifiers. The afore-mentioned preparations may contain 0.2–10%, advantageously 2–5% of the active ingredient. The following examples serve to illustrate the invention, but they are not intended to limit it thereto:

EXAMPLE 1

*N-[γ,γ,γ-tri-(4-chlorophenyl)-propyl]-N,N-bis-(β-pyridinium-ethyl)-amine-dichloride*

25.8 grams of N-[γ,γ,γ-tri-(4-chlorophenyl)-propyl]-N,N-bis-β-chloroethyl)-amine and 7.9 grams of pyridine are dissolved in 100 cc. of dry ethanol and heated for 5 hours at 120° C. in a closed vessel. The solvent is then removed under reduced pressure. The oily residue crystallizes from a mixture of isopropanol and ether. A further purification can be carried through by recrystallization from methanol/ethyl acetate. 14 grams of N-[γ,γ,γ-tri-(4-chlorophenyl)-propyl]-N,N-bis-(β-pyridiniumethyl)-amine dichloride are obtained in the form of a colorless crystaline powder which decomposes at 209–211° C. The substance crystallizes with 1 mol of methanol.

N-[γ,γ,γ-tri-(4-chlorophenyl)-propyl] - N,N - bis-(β-chlorethyl)-amine can be obtained from its hydrochloride by suspending the latter in benzene and by stirring the suspension vigorously for 1 hour at room temperature after sodium bicarbonate (excess of 50%) has been added. After filtering, the solution is evaporated at 35° C. under reduced pressure. The base, remaining as crystalline mass, can be recrystallized from cyclohexane. A weakly yellowish powder melting at 109–111° C. is obtained.

EXAMPLE 2

*N-[γ,γ,γ-tri-(4-chlorophenyl)-propyl]-N,N-bis-(β-pyridiniumethyl)-amine-dichloride*

A mixture of 27.6 grams of N-[γ,γ,γ-tri-(4-chlorophenyl)-propyl]-N,N-bis-(β - chlorethyl) - amine-hydrochloride, 11.9 grams of pyridine and 150 cc. of ethanol is heated for 4 hours at 120–130° C. in an autoclave. The residue, which remains behind after distilling off the solvent, crystallizes from isopropanol/ether. The yield is 18.1 grams. N-[γ,γ,γ-tri-(4-chlorophenyl)-propyl]-N,N-bis-(β-pyridiniumethyl)-amine-dichloride is obtained after recrystallization from methanol/ethyl acetate as a practically colorless substance which decomposes at 209–211° C. The substance crystallizes with 1 mol of methanol.

EXAMPLE 3

*N-[γ,γ,γ-tri-(4-chlorophenyl)-propyl]-N,N-bis-(β-triethyl-ammoniumethyl)-amine-dichloride*

27.6 grams of N-[γ,γ,γ-tri-(4-chlorophenyl)-propyl]-N,N-bis-(β-chlorethyl)-amine-hydrochloride, 15.2 grams of triethyl amine and 150 cc. of ethanol are heated in a closed vessel for five hours at 120° C. The alcohol is then distilled off under reduced pressure, and the residue is treated with a little acetone. After having filtered off the undissolved triethylaminohydrochloride, ether is added to the solution until the latter becomes turbid. On standing, 16.5 grams of N-[γ,γ,γ-tri-(4-chlorophenyl)-propyl]-N,N-bis-(β-triethylammoniumethyl)-amine-dichloride separate in the form of practically colorless crystals. They decompose at 102–104° C. and contain 1 mole of crystal acetone. By recrystallization from acetone the decomposition point is not changed.

EXAMPLE 4

*N-[γ,γ,γ-tri-(4-chlorophenyl)-propyl]-N,N-bis-(β-tributyl-ammoniumethyl)-amine-dichloride*

A solution of 25.8 grams of N-[γ,γ,γ-tri-(4-chlorophenyl)-propyl]-N,N-bis-(β-chlorethyl)-amine and 18.5 grams of tri-n-butylamine in 100 cc. of ethanol is heated in a closed vessel for 4 to 5 hours at 120° C. After evaporation of the alcohol, N-[γ,γ,γ-tri-(4-chlorophenyl)-propyl] - N,N - bis-(β-tributylammoniumethyl)-amine-dichloride remains as a very viscous yellow oil. In order to purify it, it can be dissolved in a little ethyl acetate and reprecipitated by means of diisopropyl ether after filtering. The last residues of the solvents are removed by boiling the reaction product for several hours at 50° C. in a high vacuum. The yield is 35 grams.

EXAMPLE 5

*N - [γ,γ,γ - tri - (4-chlorophenyl)-propyl]-N,N-bis-(N'β-hydroxy - ethyl - N',N'-diethyl-ammoniumethyl)-amine-dichloride*

A mixture of 27.6 grams of N-[γ,γ,γ-tri-(4-chlorophenyl) - propyl] - N,N - bis-(β-chlorethyl)-amine-hydrochloride, 17.6 grams of β-diethylamino ethyl alcohol and 150 cc. of ethanol is heated in an autoclave for five hours at 120° C. After distilling off the solvent, the oil is taken up in acetone, and the undissolved diethylaminoethanol hydrochloride is filtered off. On cooling, 16 grams of N-[γ,γ,γ - tri - (4-chlorophenyl)-propyl]-N,N-bis-(N'-β-hydroxy ethyl-N',N'-diethylammoniumethyl)-amine-dichloride crystallize from the filtrate. In order to purify the new compound it can be recrystallized from isopropanol/ethylacetate. The salt melts at 150–152° C.

EXAMPLE 6

*N - [γ,γ,γ - tri - (4 - chlorophenyl)-propyl]-N,N-bis-(N'-cyanomethyl - N',N'-dimethyl-ammoniumethyl)-amine-dichloride*

A mixture of 25.8 grams of N-[γ,γ,γ-tri-(4-chlorophenyl)-propyl]-N,N-bis-(β-chlorethyl)-amine, 8.4 grams of dimethylamino-acetonitrile and 120 cc. of alcohol is heated in a closed vessel for 4 hours at 120° C. After distilling off the solvent, N-[γ,γ,γ-tri-(4-chlorophenyl)-propyl] - N,N - bis-(N'-cyanomethyl-N',N'-dimethyl-ammoniumethyl)-amine-dichloride is obtained in the form of a brownish, very viscous oil which is purified as described in Example 4 by dissolving and reprecipitating it.

EXAMPLE 7

*N - [γ,γ,γ - tri - (4 - chlorophenyl)-propyl]-N-N-bis-(β-N'-amino-piperidiniumethyl)-amine-dichloride*

27.6 grams of N-[γ,γ,γ-tri-(4-chlorophenyl)-propyl]-N,N-bis-(β-chlorethyl)-amine-hydrochloride, 15 grams of N-aminopiperidine and 100 cc. of ethanol are heated in an autoclave for 5 hours at 120° C. The alcohol is subsequently distilled off under reduced pressure. The residue is dissolved in 60 cc. of isopropanol and mixed with 160 cc. of ethyl acetate. On standing, 24.5 grams of N-[γ,γ,γ-tri - (4 - chlorophenyl) - propyl]-N,N-bis-(β-N'-amino-piperidiniumethyl)-amine-dichloride crystallize out. By dissolving and reprecipitating the compound from isopropanol/ethylacetate it can be purified. The compound contains 1 mol of crystal isopropanol and decomposes at 155–157° C. The yield is 18 grams. If the recrystallization is carried through from methanol/ethyl acetate, the salt crystallizes with one mol of methanol. The product obtained decomposes at 160–162° C.

EXAMPLE 8

*N - [γ,γ,γ - tri - (4 - chlorophenyl)-propyl]-N,N-bis-(N'-carbethoxy - methyl - N',N' - diethyl-ammoniumethyl)-amine-dichloride*

A mixture of 51.5 grams of N-[γ,γ,γ-tri-(4-chlorophenyl)-propyl]-N,N-bis-(β-chlorethyl)-amine, 31.8 grams of diethylamino ethyl acetate and 200 cc. of alcohol is heated in an autoclave for 4 hours at 120–130° C. After evaporation of the solvent, N-[γ,γ,γ-tri-(4-chlorophenyl)-propyl] - N,N - bis - (N'-carbethoxymethyl-N',N'-diethylammoniummethyl)-amine-dichloride is obtained in the form of a brown viscous oil. The yield is 82.5 grams. The product can be purified by dissolving it repeatedly in ethyl alcohol and reprecipitating it by the addition of diisopropyl ether.

EXAMPLE 9

N - [γ,γ,γ - tri - (4-chlorophenyl)-propyl]-N,N-bis-(β-N'-acetyl - aminoethyl - N',N' - diethyl-ammoniumethyl)-amine-dichloride 25.8 grams of N-[γ,γ,γ-tri-(4-chlorophenyl-propyl]-N, N-bis-(β-chlorethyl)-amine and 15.8 grams of acetic acid β-diethylamino-ethyl amide are dissolved in 120 cc. of alcohol and heated in an autoclave for 4 hours at 120° C. The solvent is then distilled off. As residue there are obtained 30 grams of N-[γ,γ,γ-tri-(4-chlorophenyl)-propyl]-N,N - bis - (β-N'-acetylaminoethyl-N',N'-diethyl-ammoniumethyl)-amine-dichloride in the form of a brown, very viscous oil which can be purified by dissolving and reprecipitating it from ethyl alcohol/diisopropyl ether.

EXAMPLE 10

N-[β,β-bis-(3,4-dichlorobenzyl)-ethyl]-N,N-bis-(β-pyridiniumethyl)-amine-dichloride 24.5 grams of N-[β,β-bis-(3,4-dichlorobenzyl)-ethyl]-N,N-bis-(β-chlorethyl)-amine and 7.9 grams of pyridine are dissolved in 120 cc. of ethanol and the mixture is heated in a closed vessel for 2 hours at 120–130° C. After distilling off the alcohol N-[β,β-bis-(3,4-dichlorobenzyl) - ethyl - N,N-bis-(β-pyridiniumethyl)-amine-dichloride remains as a light yellow, very viscous oil which can be purified by dissolving it in ethanol and reprecipitating it from diisopropyl ether. The yield is 21 grams.

EXAMPLE 11

N-[β-(4-chlorophenyl)-γ-(2,4-dichlorophenyl)-propyl]-N,N-bis-(β-pyridiniumethyl)-amine-dichloride A mixture of 37 grams of N-[β-(4-chlorophenyl)-γ-(2,4 - dichlorophenyl) - propyl] - N,N-bis-(β-chlorethyl)-amine, 13.5 grams of pyridine and 120 cc. of ethanol is heated for 4 hours at 120° C. in an autoclave. The alcohol is then completely distilled off and the N-[β-(4-chlorophenyl) - γ - (2,4 - dichlorophenyl) - propyl]-N,N-bis-(β-pyridiniumethyl)-amine-dichloride is obtained in the form of a viscous brown oil. It is purified by dissolving and reprecipitating it from ethanol/diisopropyl ether. The yield is 31 grams.

We claim:

1. A compound of the formula

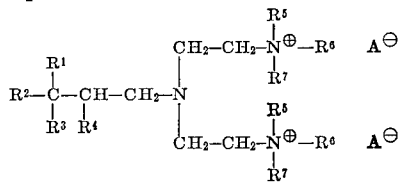

wherein
$R^1$ is halophenyl;
$R^2$ and $R^3$ each are hydrogen, phenyl or halophenyl;
$R^4$ is hydrogen, halophenyl or halobenzyl;
$R^5$, $R^6$ and $R^7$ together with N stand for an unsaturated heterocyclic ring system of 6 ring members optionally substituted by a member of the group consisting of lower alkyl, cyano, carboxy, lower carbalkoxy and carbamyl, and
$A^\ominus$ is the anion of a non-toxic acid.

2. N-[α,α,α-tri-(4-chlorophenyl)-propyl] - N,N-bis-(β-pyridiniumethyl)-amine-dichloride.

3. N-[β,β-bis-(3,4-dichlorobenzyl)-ethyl] - N,N-bis-(β-pyridiniumethyl)-amine-dichloride.

4. N-[β-(4-chlorophenyl) - γ - (2,4 - dichlorophenyl)-propyl]-N,N-bis-(β-pyridiniumethyl)-amine-dichloride.

5. N-[β-(2,4-dichlorophenyl)-γ-(2,4 - dichlorophenyl)-propyl]-N,N-bis-(β-pyridiniumethyl)-amine-dichloride.

References Cited

FOREIGN PATENTS 1,036,090   7/1966   Great Britain.

OTHER REFERENCES

Burger: Medicinal Chemistry, 2nd edition, Interscience (1960), p. 78.

WALTER A. MODANCE, *Primary Examiner.*

A. ROTMAN, *Assistant Examiner.*